US010033247B2

(12) United States Patent
Yang et al.

(10) Patent No.: US 10,033,247 B2
(45) Date of Patent: Jul. 24, 2018

(54) SLIDING MECHANISM AND MACHINING DEVICE USING THE SAME

(71) Applicants: FU DING ELECTRONICAL TECHNOLOGY (JIASHAN) CO., LTD., Zhejiang (CN); HON HAI PRECISION INDUSTRY CO., LTD., New Taipei (TW)

(72) Inventors: Ming-Lu Yang, New Taipei (TW); Yang-Mao Peng, Jiashan (CN); Jian-Shi Jia, Jiashan (CN); Jing-Shuang Sui, Jiashan (CN); Zhen-Guang Xu, Jiashan (CN); Jun Fu, Jiashan (CN)

(73) Assignees: FU DING ELECTRONICAL TECHNOLOGY (JIASHAN), Jiashan (CN); HON HAI PRECISION INDUSTRY CO., LTD., New Taipei (TW)

( * ) Notice: Subject to any disclaimer, the term of this patent is extended or adjusted under 35 U.S.C. 154(b) by 515 days.

(21) Appl. No.: 14/920,891

(22) Filed: Oct. 23, 2015

(65) Prior Publication Data

US 2016/0118860 A1    Apr. 28, 2016

(30) Foreign Application Priority Data

Oct. 28, 2014    (CN) .......................... 2014 1 0585862

(51) Int. Cl.
*H02K 1/34*    (2006.01)
*H02K 7/14*    (2006.01)
(Continued)

(52) U.S. Cl.
CPC ............... *H02K 7/14* (2013.01); *H02K 33/02* (2013.01); *H02K 33/12* (2013.01); *H02K 1/34* (2013.01); *H02K 41/02* (2013.01)

(58) Field of Classification Search
CPC .......... H02K 1/34; H02K 7/14; H02K 7/1869; H02K 33/00–33/18; H02K 35/00–35/06; H02K 41/02
(Continued)

(56) References Cited

U.S. PATENT DOCUMENTS 9,517,541 B2 * 12/2016 Yang ....................... F16D 59/02
2006/0180017 A1 * 8/2006 Williams .............. F16D 63/008
92/88

(Continued)

FOREIGN PATENT DOCUMENTS

| CN | 202317693 | 7/2012 |
|---|---|---|
| TW | 514166 U | 12/2002 |
| TW | 200742627 A | 11/2007 |

*Primary Examiner* — John K Kim
*Assistant Examiner* — Minki Chang
(74) *Attorney, Agent, or Firm* — ScienBiziP, P.C.

(57) ABSTRACT

A sliding mechanism includes a case, a sliding assembly mounted in the case and a stopping assembly. The sliding assembly includes a sliding member and a driving member supplying power for the sliding member. The stopping assembly includes a resisting portion mounted in the case, two first sliders and a pushing portion positioned on the resisting portion, and two first elastic portions. The resisting portion includes two slant surfaces. The first elastic portions resist the first sliders and the resisting portion. The first sliders are driven by the pushing portion to move along the slant surfaces of the resisting portion and away from the resisting portion, thereof compressing the first elastic portions. The first sliders are driven by the elastic forces of the first elastic portions to move along the slant surfaces and toward the sliding member, thereof clamping the sliding member.

20 Claims, 10 Drawing Sheets

(51) Int. Cl.
  *H02K 33/02* (2006.01)
  *H02K 33/12* (2006.01)
  *H02K 41/02* (2006.01)

(58) Field of Classification Search
  USPC .......................................... 310/12.01, 12.19
  See application file for complete search history.

(56) References Cited

U.S. PATENT DOCUMENTS

2011/0052348 A1* 3/2011 Hanamura ............. H02K 16/00
  414/225.01
2012/0128277 A1* 5/2012 Ju .......................... B23Q 1/262
  384/10

* cited by examiner

SLIDING MECHANISM AND MACHINING DEVICE USING THE SAME

CROSS-REFERENCE TO RELATED APPLICATIONS

This application claims priority to Chinese patent application no. 201410585862.5 filed on Oct. 28, 2014, the contents of which are incorporated by reference herein.

FIELD

The subject matter generally relates to a sliding mechanism, especially relates to a sliding mechanism which can be stopped moving quickly without power and a machining device using the sliding mechanism.

BACKGROUND

In a machining process, a work-piece generally moves rapidly to be machined. A general machining device includes a driver mechanism and a work-piece placed on the driver mechanism. The driver mechanism drives the work-piece moving. When the machining device is without power, the driver mechanism will remain moving with inertial property.

BRIEF DESCRIPTION OF THE DRAWINGS

Implementations of the present technology will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "substantially" is defined to be essentially conforming to the particular dimension, shape, or other feature that the term modifies, such that the component need not be exact. For example, "substantially rectangular" means that the object resembles a rectangle, but can have one or more deviations from a true rectangle. The term "comprising" when utilized, means "including, but not necessarily limited to"; it specifically indicates open-ended inclusion or membership in the so-described combination, group, series and the like.

Figure 1:
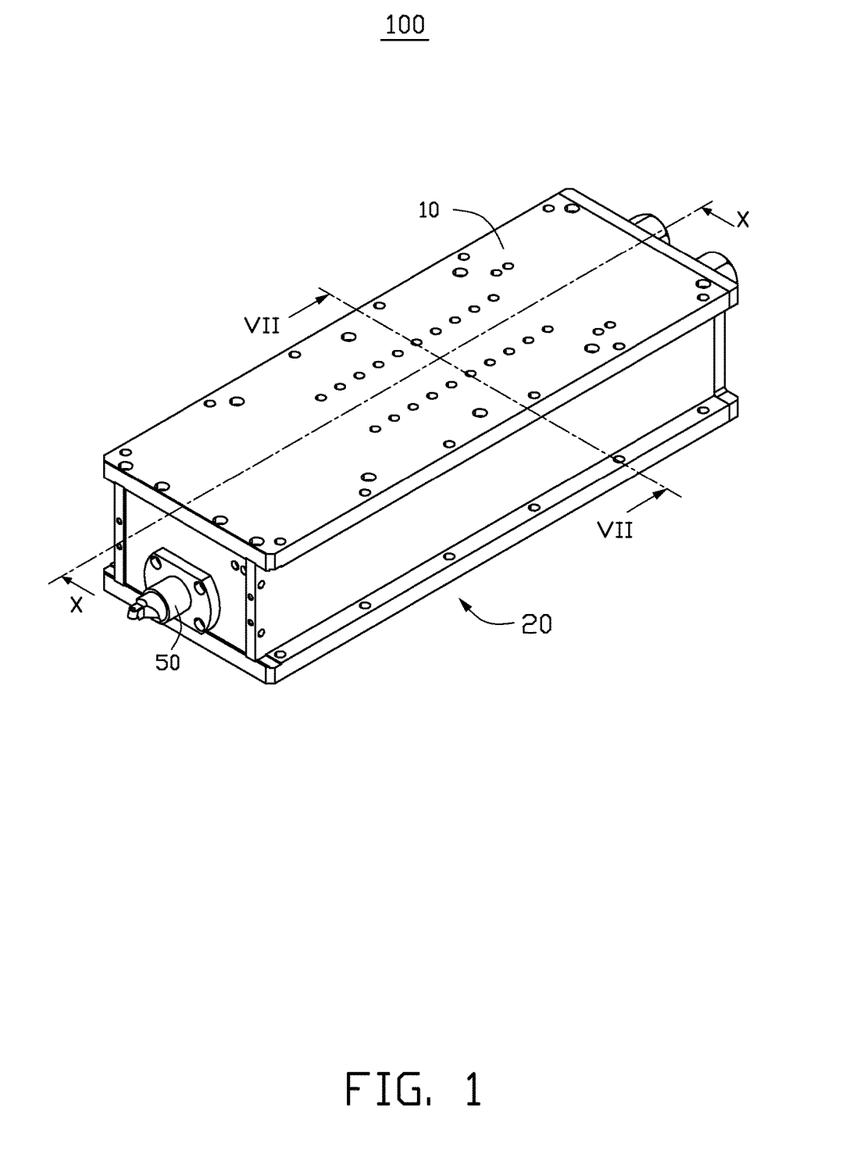
FIG. 1 is an assembled, isometric view of a machining device without a work-piece in accordance with an exemplary embodiment of the present disclosure.

Referring to FIG. 1, the machining device 100 in an exemplary embodiment of the present disclosure includes a sliding mechanism 20 and a machining mechanism 50. The machining mechanism 50 is fixed on an end of the sliding mechanism 20 to be driven by the sliding mechanism 20. The machining device 100 is used for machining a work-piece (not shown in the figures). In this exemplary embodiment, the work-piece is a cutting tool and the machining device 100 is used for turning the work-piece. In other exemplary embodiments, the machining device 100 can also be used for polishing or milling the work-piece.

Figure 2:
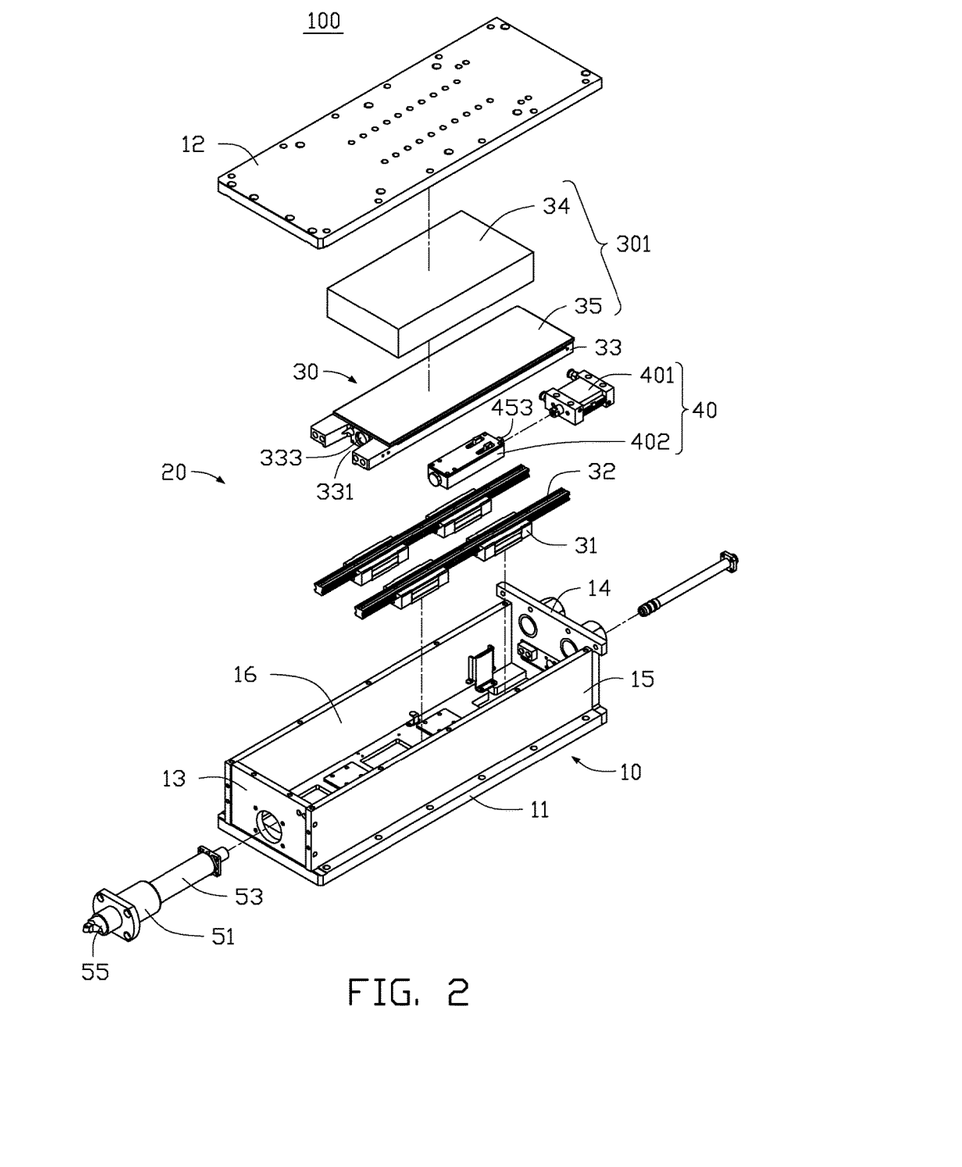
FIG. 2 is an exploded, isometric view of the machining device in FIG. 1.
Figure 10:
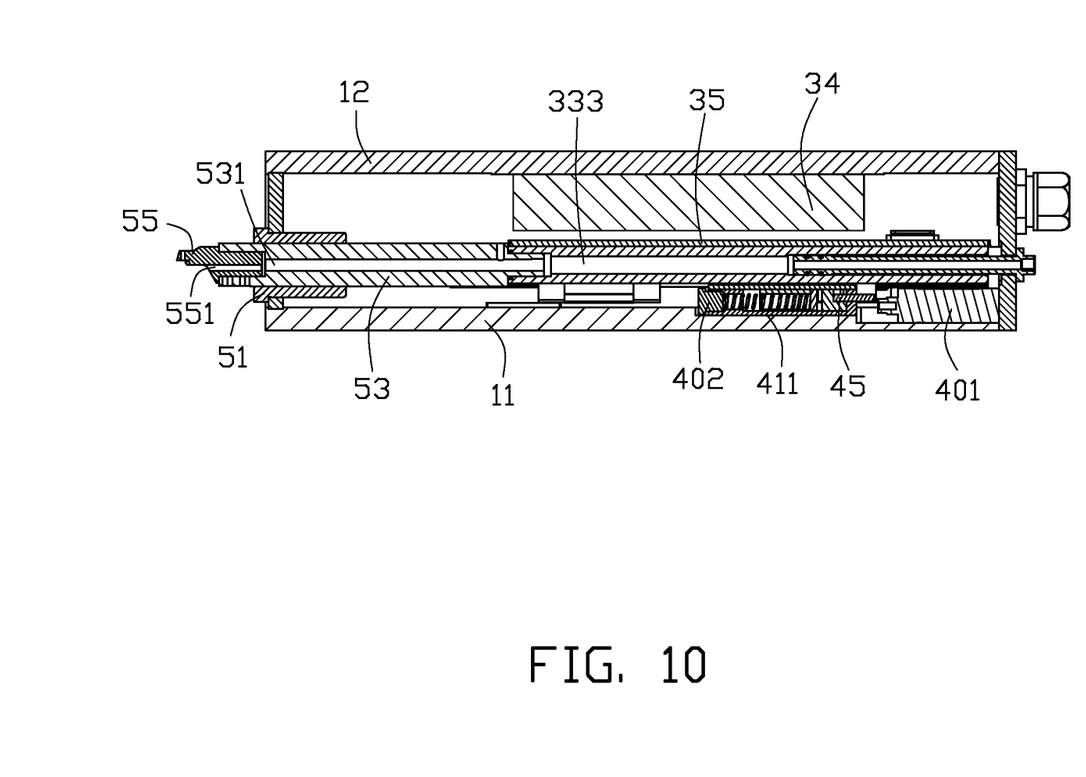
FIG. 10 is a cross-section view of the machining device in FIG. 1, taken along a line X-X thereof.

Referring to FIG. 2, the sliding mechanism 20 includes a case 10, a sliding assembly 30 and a stopping assembly 40. Referring to FIG. 10 at the same time, the sliding assembly 30 and the stopping assembly 40 are received in the case 10. The sliding assembly 30 and the stopping assembly 40 are fixed in the case 10. The stopping assembly 40 is close to the sliding assembly 30 to stop movement of the sliding assembly 30. The machining mechanism 50 is fixed on the sliding assembly 30 and further protrudes out of the case 10. The machining mechanism 50 is driven by the sliding assembly 30.

Referring to FIG. 2 again, the case 10 is substantially rectangular. The case 10 includes six plates. Every two plates form a pair. The two plates in each pair are parallel to each other. The six plates together form a hollow rectangle. Specifically, the case 10 includes a first fixing plate 11, a second fixing plate 12, a third fixing plate 13, a fourth fixing plate 14, a fifth fixing plate 15 and a sixth fixing plate 16. The first fixing plate 11 is parallel to the second fixing plate 12 and the fifth fixing plate 15 is parallel to the sixth fixing plate 16. The third fixing plate 13 and the fourth fixing plate 14 are parallel to each other to be two ends of the case 10.

The sliding assembly 30 is fixed on the first plate 11 of the case 10. The sliding assembly 30 includes four sliding rails 31, two draw slips 32, a sliding member 33 and a driving member 301. Each draw slip 32 is held by two corresponding sliding rails 31. The sliding member 33 is fixed on the draw slips 32. The driving member 301 is fixed on the sliding member 33 and supplies power for the sliding member 33 to slide.

The four sliding rails 31 are all the same and form a rectangle together. Specifically, the central points of every two sliding rails 31 are connected via virtual lines to form a rectangle. A sliding groove 311 is defined on each sliding rail 31. Each sliding groove 311 is recessed from a side surface of a corresponding sliding rail 31 inwardly. The four sliding rails 31 are fixed on the first fixing plate 11 of the case 10 with the sliding grooves 311 upward. In other words, the sliding grooves 311 face the second fixing plate 12.

The draw slips 32 are positioned in the sliding grooves 311 of the sliding rails 31. The two draw slips 32 are parallel to each other. Each draw slip 32 is held by two sliding grooves 311. The draw slips 32 can be sliding along the sliding grooves 311.

The sliding member 33 is substantially rectangular. A lengthwise direction of the sliding member 33 is parallel to that of the case 10. An installing groove 331 and a through hole 333 are defined on the sliding member 33. The installing groove 331 is defined on an end of the sliding member 33. Specifically, the installing groove 331 is recessed from a center of the end into the sliding member 33. In this exemplary embodiment, the installing groove 331 is U-shaped. The installing groove 331 is closed to the third fixing plate 13. The through hole 333 penetrates the two opposite ends of the sliding member 33. The through hole 333 faces the installing groove 331. An axis of the through hole 333 is coincident with the a lengthwise axis of the sliding member 33.

Figure 7:
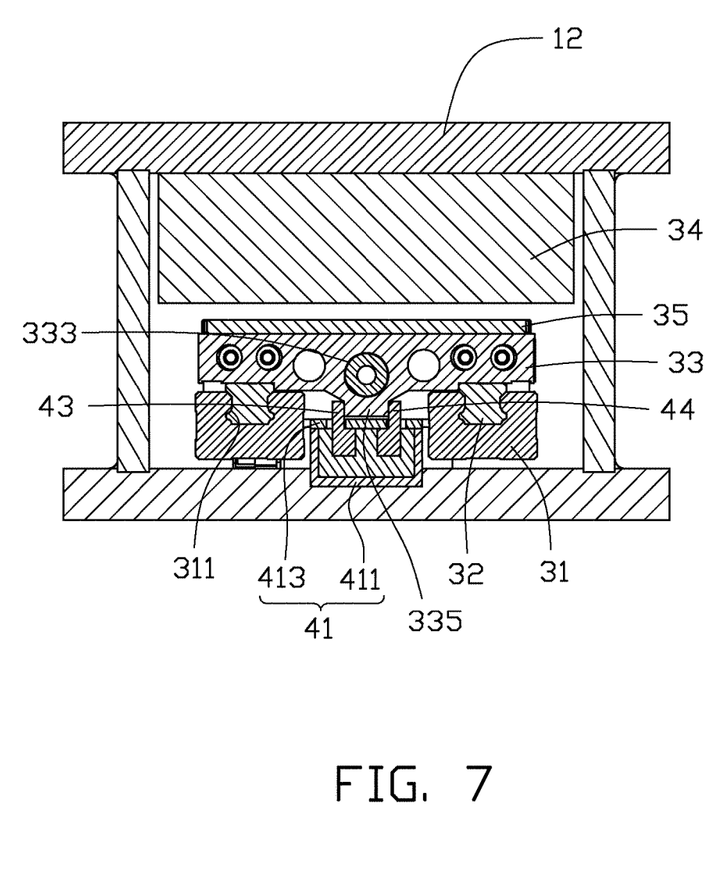
FIG. 7 is a cross-section view of the machining device in FIG. 1 under an original state, taken along a line VII-VII thereof.

Referring to FIG. 7 at the same time, an extending part 335 is formed on the sliding member 33. The extending part 335 perpendicularly and downwards extends away from a bottom surface of the sliding member 33. The extending part 335 is located between the two draw slips 32. A lengthwise direction of the extending part 335 is parallel to the extension direction of the draw slip 32.

Referring to FIG. 2 again, the driving member 301 includes a stator 34 and an active cell 35. The stator 34 and the active cell 35 together supply power for the sliding member 33 to move. In this exemplary embodiment, the stator 34 is an iron core coil and the active cell 35 is a magnetic plate. When the stator 34 is supplied with electronic power, the active cell 35 can be driven to move according to the electromagnetic induction principle. The active cell 35 is substantially rectangular. The active cell 35 is fixed on the sliding member 33. The stator 34 is fixed on the second fixing plate 12 and faces the stator 34. The active cell 35 and stator 34 are parallel to each other. The active cell 35 and stator 34 are separated from each other with a presupposed distance therebetween.

Figure 3:
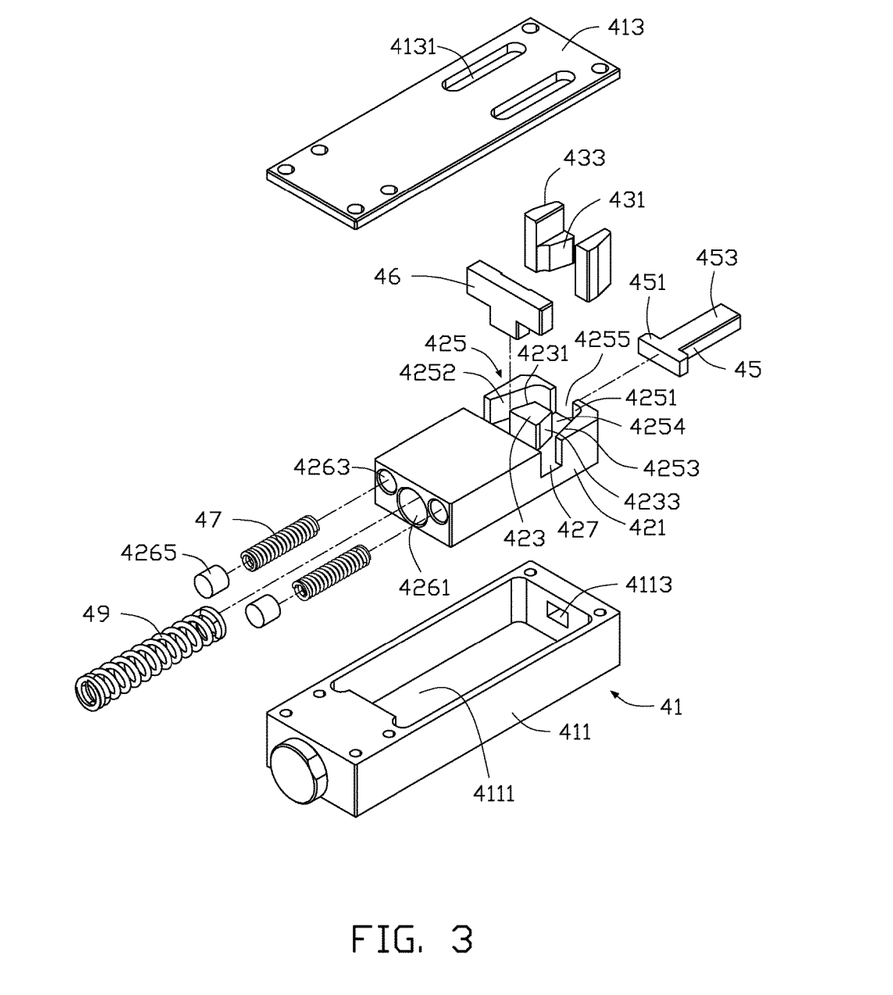
FIG. 3 is an exploded, isometric view of an active member of FIG. 2.

Referring to FIG. 2 and FIG. 3, the stopping assembly 40 includes a power member 401 and an active member 402. The power member 401 is located at an end of the active member 402 to supply a driving force to the active member 402. Specifically, the power member 401 is fixed on the fourth fixing plate 14 of the case 10 and the active member 402 is fixed on the first fixing plate 11 of the case 10. In this exemplary embodiment, the power member 401 is an air cylinder. In other exemplary embodiments, the power member 401 can also be an electronic machine. Referring to FIG. 7 at the same time, the stopping assembly 40 is located under the sliding member 33 of the sliding assembly 30 and positioned between the two draw slips 32 of the sliding assembly 30.

Figure 5:
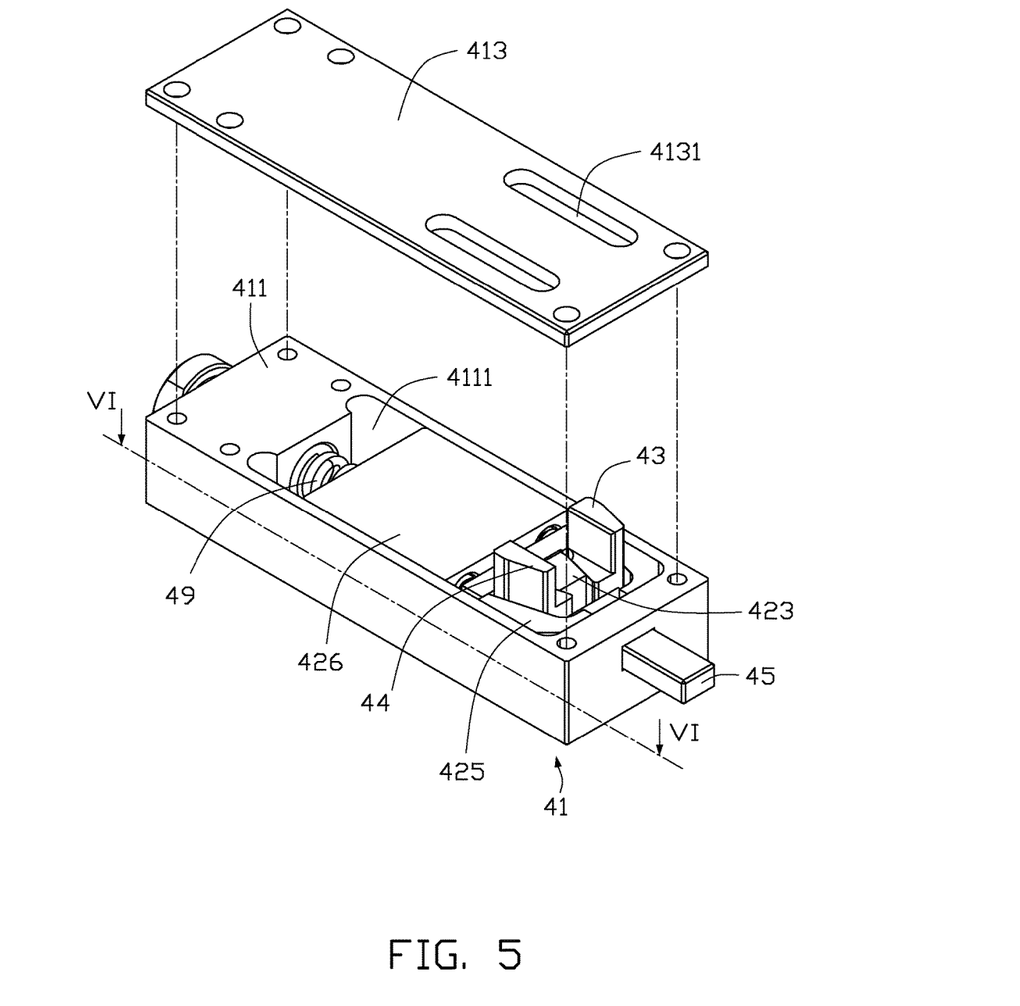
FIG. 5 is an assembled, isometric view of an active member of FIG. 2.

Referring to FIG. 3 and FIG. 5, the active member 402 includes a housing 41, a resisting portion 42, two first sliders 43, a pushing portion 45, a second slider 46, two first elastic portions 47 and a second elastic portion 49. The resisting portion 42, the two first sliders 43, the pushing portion 45, the second slider 46, the two first elastic portions 47 and the second elastic portion 49 are received in the housing 41.

Referring to FIG. 3, the housing 41 is substantially rectangular. Referring to FIG. 7 at the same time, the housing 41 is fixed on the first fixing plate 11 of the case 10. Specifically, the housing 41 includes a base 411 and a lid 413. The base 411 is fixed on the first fixing plate 11 of the case 10. The lid 413 is fixed on the base 411 and coupled with the base 411.

Referring to FIG. 3 again, a cavity 4111 and a mounting hole 4113 are defined on the base 411. The cavity 4111 is recessed from a top surface of the base 411 inwardly. The cavity 4111 is substantially rectangular. The cavity 4111 faces the lid 413 to receive the resisting portion 42, the two first sliders 43, the pushing portion 45, the second slider 46, the two first elastic portions 47 and the second elastic portion 49. The mounting hole 4113 is defined on an end of the base 411. The mounting hole 4113 is recessed from the end of the base 411 inwardly. The mounting hole 4113 and the cavity 4111 are interconnected to position the pushing portion 45.

The lid 413 is substantially rectangular. The lid 413 is fixed on the top surface of the base 411 to cover the cavity 4111. Two sliding shots 4131 are defined on the lid 413. The two sliding shots 4131 are parallel to each other. Each sliding slot 4131 penetrates the top and bottom surfaces of the lid 413. An extension direction of each sliding slot 4131 is parallel to a lengthwise direction of the lid 413.

Referring to FIG. 3 and FIG. 5, the resisting portion 42 is received in the cavity 4111 of the base 411. The resisting portion 42 can slid in the cavity 4111. A sliding direction of the resisting portion 42 is parallel to a lengthwise direction of the housing 41.

Referring to FIG. 3 again, the resisting portion 42 includes a supporting plate 421, a first bump 423, a second bump 425 and a fixing part 426. The first bump 423, the second bump 425 and the fixing part 426 are formed on a top surface of the supporting plate 421. Specifically, the first bump 423, the second bump 425 and the fixing part 426 extend upwards away from the top surface of the supporting plate 421 perpendicularly. Top surfaces of the first bump 423, the second bump 425 and the fixing part 426 are coplanar. The second bump 425 and the fixing part 426 are located at opposite edges of the top surface of the supporting plate 421 respectively. The first bump 423 is located between the second bump 425 and the fixing part 426. The first bump 423 is separated from the second bump 425 and the fixing part 426.

Figure 4:
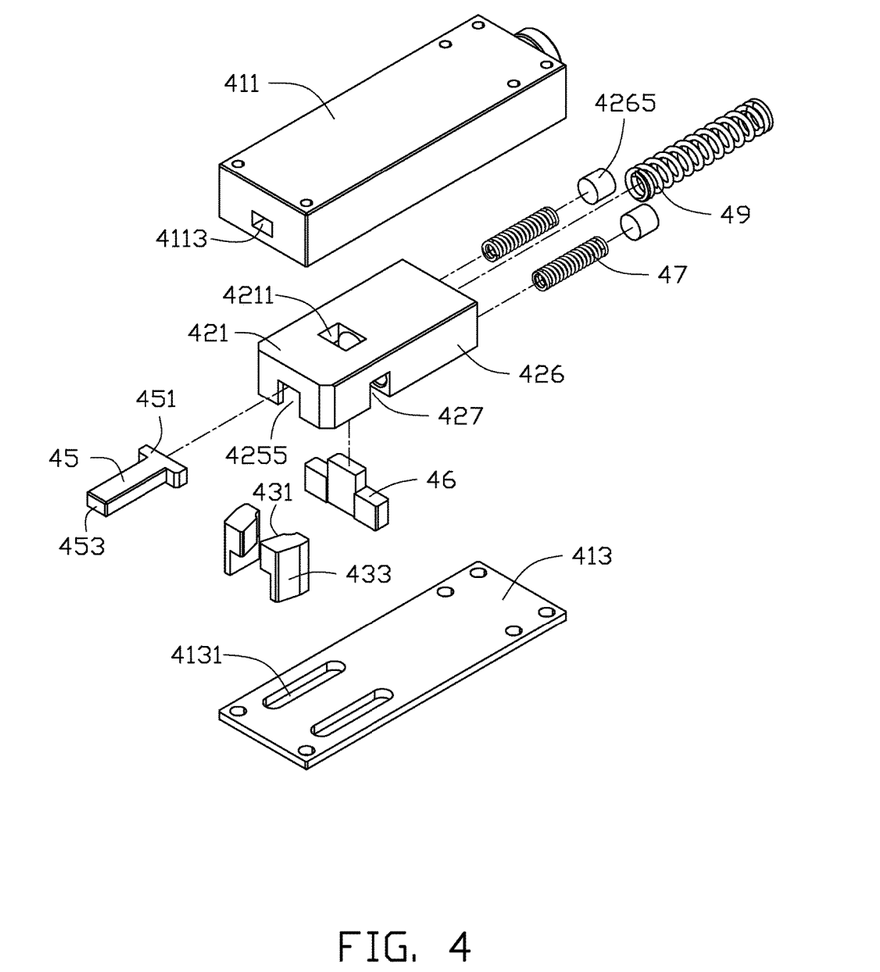
FIG. 4 is an exploded, isometric view of an active member of FIG. 2 from a different angle.

The supporting plate 421 is flat. The supporting plate 421 is substantially rectangular. Referring to FIG. 4 at the same time, an opening 4211 is defined on the supporting plate 421 for holding the second slider 46. The opening 4211 penetrates a top and bottom surfaces of the supporting plate 421. The opening 4211 is located between the fixing part 426 and the first bump 423. In other words, the first bump 423 and the fixing part 426 are located beside two opposite sides of the opening 4211.

Referring to FIG. 3 and FIG. 4, the first bump 423 is located at a center of the supporting plate 421 in a wide-direction. A wide of the first bump 423 decreases gradually away from the opening 4211, resulting in a top surface of the first bump 423 being substantially an isosceles trapezoid. The first bump 423 includes two resisting surfaces 4231. The two resisting surfaces 4231 are two opposite side surfaces of the first bump 423. The two resisting surfaces 4231 are slant relative to the axis of the supporting plate 421.

Referring to FIG. 3 again, the second bump 425 is located at edges of the top surface of the supporting plate 421. The second bump 425 is U-shaped. An opening of the U-shape faces the fixing part 426 and receives the first bump 423. The second bump 425 is separated from the fixing part 426 with a first groove 427 defined therebetween. The first groove 427 is used for positioning the second slider 46.

The second bump 425 includes a bottom surface 4251 and two slant surfaces 4252, 4253. The two slant surfaces 4252, 4253 are slant to the bottom surface 4251. A distance between the two slant surfaces 4252, 4253 increases gradually away from bottom surface 4251. The bottom surface 4251, two slant surfaces 4252, 4253 of the second bump 425 and the top surface of the supporting plate 421 together define a holding groove 4254. The first bump 423 is received in the holding groove 4254. A second groove 4255 is defined on the center of the bottom surface 4255. The second groove 4255 and the holding groove 4254 are interconnected.

The fixing part 426 is substantially rectangular. A first hole 4261 and two second holes 4263 are defined in the fixing part 426 along a lengthwise axis of the fixing part 426. The two second holes 4263 are located at two sides of the first hole 4261 respectively and symmetrically. The first hole 4261 is a blind hole. The first hole 4261 is recessed from an end of the fixing part 426 away from the first bump 423 inwards and perpendicularly. The first hole 4261 is interconnected to the cavity 4111 of the housing 41. The first hole 4261 is used for receiving the second elastic portion 49. The second holes 4263 penetrate two ends of the fixing part 426. The second holes 4263 are interconnected to the holding groove 4254 of the resisting portion 42. Each second hole 4263 is stifled by a plug 4265. The plugs 4265 are located at an end of the second holes 4263 away from the first bump 423. The two second holes 4263 are used for receiving the two first elastic portions 47 respectively.

Referring to FIG. 3 and FIG. 5, the bottoms of the two first sliders 43 are received in the holding groove 4254 of the resisting portion 42. The two first sliders 43 are respectively positioned between the first bump 423 and the second bump 425 of the resisting portion 42. One of the first sliders 43 is located between the resisting surface 4231 of the first bump 423 and the slant surface 4252 of the second bump 425, and the other first slider 43 is located between the resisting surface 4231 of the first bump 423 and the slant surface 4253 of the second bump 425. Each first slider 43 includes a first surface 431 and a second surface 433. The first surfaces 431 of the first sliders 43 are attached on the resisting surfaces 4231 of the first bump 423 respectively. The second surfaces 433 of the first sliders 43 are attached on the slant surface 4251 and 4253 of the second bump 425. The two first sliders 43 can slide in the holding groove 4254. The tops of the two first sliders 43 respectively extrude through the two sliding shots 4131 of the lid 413 of the housing 41. Referring to FIG. 7 at the same time, the tops of the two first sliders 43 are located at two opposite sides of the extending part 335 of the sliding member 33 respectively.

Referring to FIG. 3 and FIG. 5, the pushing portion 45 is T-shaped. The pushing portion 45 includes two opposite ends 451 and 453. The end 451 of the pushing portion 45 is received in the holding groove 4254 of the resisting portion 42. The end 453 of the pushing portion 45 protrudes out of the housing 41 through the second groove 4255 of the resisting portion 42 and the mounting hole 4113 of the base 411. The pushing portion 45 can slide in the holding groove 4254. The end 451 of the pushing portion 45 can be resisted against the two first sliders 43 and the first bump 423. Referring to FIG. 2 at the same time, the end 453 of the pushing portion 45 faces the power member 401 and is driven by the power member 401.

Referring to FIG. 3 to FIG. 5, the second slider 46 is T-shaped. The second slider 46 is received in the first groove 427 and the opening 4211. The second slider 46 is located between the second bump 425 and the fixing part 426.

The first elastic portions 47 are respectively received in the two second holes 4263. One end of each first elastic portion 47 resists against the second slider 46. The other end of each first elastic portion 47 resists against the plug 4265. One end of the second elastic portion 49 is received in the first hole 4261 and resists against the second slider 46. The other end of the second elastic portion 49 resists against an inner surface of the cavity 4111 which is close to the resisting portion 42. In this exemplary embodiment, the first elastic portions 47 and the second elastic portion 49 are springs.

Figure 9:
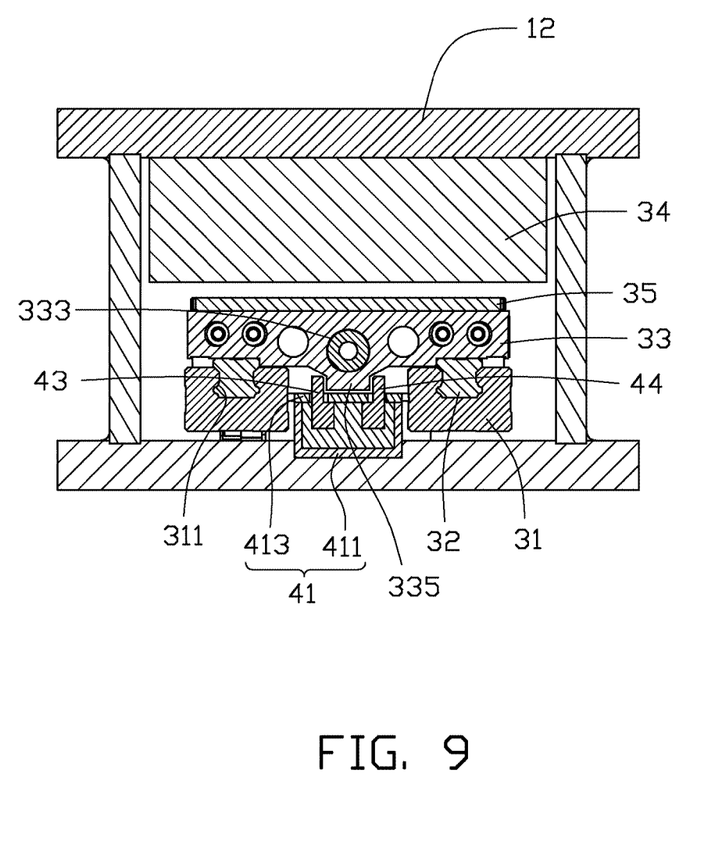
FIG. 9 is a cross-section view of the machining device in FIG. 1 under an operation state.

Referring to FIG. 2 and FIG. 5, when the stopping assembly 40 works, the power member 401 drives the pushing portion 45 to move toward the first bump 423. The two first sliders 43 are driven by the end 451 of the pushing portion 45 to slide away from each other and further compress the first elastic portions 47. At the same time, the resisting portion 42 is driven by the elastic forces of the first elastic portions 47 to slide in the cavity 4111 away from the pushing portion 45 to compress the second portion 49. Thus, the two first sliders 43 free the extending part 335 gradually, as shown in FIG. 9.

Then the above operation is made again and again until the pushing portion 45 resisting the first bump 423 and the end of the resisting portion 42 away from the pushing portion 45 resisting base 411. In the process, the first bump 423 is driven by the pushing portion 45 to make the resisting portion 42 slide in the cavity 4111, further resulting in the second elastic portion 49 compressed.

Referring to FIG. 2 and FIG. 10, the machining mechanism 50 is fixed in the installing groove 331. The machining mechanism 50 protrudes out of the case 10 through the third fixing plate 13. The machining mechanism 50 includes an external member 51, a link member 53, a fixing member 55 and a machined member fixed on the fixing member 55 (not shown in figures). The fixing member 55 is fastened on an end of the link member 53. The link member 53 is coated by the external member 51.

The external member 51 is a hollow rotator. The external member 51 is T-shaped. One end of the external member 51 is fixed on the third fixing plate 13 of the case 10. The other end of the external member 51 is received in the case 10.

One end of the link member 53 is fixed in the installing groove 331 of the sliding member 33. The other end of the link member 53 protrudes out of the case 10 through the external member 51. The link member 53 can move in the external member 51. A channel 531 is defined in the link member 53. The channel 531 is interconnected to the through hole 333 of the sliding member 33. An axis of the channel 531 is coincident with an axis of the through hole 333 of the sliding member 33.

The fixing member 55 is fixed on an end of the link member 53 away from the sliding member 33 for fixing the machined member. A through hole 551 is defined in the fixing member 55. The through hole 551 is interconnected to the channel 531. An axis of the through hole 551 is parallel to the axis of the channel 531. Cutting fluid (not shown in figures) can be injected on the work-piece through the through hole 333 of the sliding member 33, the channel 531 of the link member 53 and the through hole 551 of the fixing member 55, thereof speeding up the cooling velocity of the work-piece.

The sliding mechanism 20 is assembled as following:

The base 411 is fixed on the first fixing plate 11. The first elastic portions 47 and the second elastic portion 49 are positioned in the resisting portion 42. The end 451 of the pushing portion 45 is received in the holding groove 4254.

The end 453 of the pushing portion 45 protrudes through the second groove 4255. The two first sliders 43 and the second slider 46 are positioned in the holding groove 4254 and first groove 427 respectively. The resisting portion 42 is positioned in the cavity 4111. The resisting portion 42 is driven by the pushing portion 45 to compress second elastic portion 49, thereof making the end 453 of the pushing portion 45 point to the mounting hole 4113. Then, the end 453 of the pushing portion 45 protrudes out of the housing 41 through the mounting hole 4113 by the elastic force of the second elastic portion 49. The lid 413 is fixed on the base 411 with the two first sliders 43 protruding through the two sliding shots 4131 respectively. The power member 401 is fixed on the fourth fixing plate 14. The power member 401 is closed to the pushing portion 45.

The sliding rails 31 are fixed on the first fixing plate 11. The draw slips 32 are positioned on the sliding rails 31. The sliding member 33 is fixed on the draw slips 32. The two first sliders 43 of the stopping assembly 40 are driven by the pushing portion 45 with an outer force to make the extending part 335 positioned between the two first sliders 43. Then, the pushing portion 45 is free, the two first sliders 43 is driven by the elastic forces of the first elastic portions 47 and the second elastic portion 49 to move and clamp the extending part 335.

The machining mechanism 50 is fixed on the sliding member 33. The machining mechanism 50 protrudes out of the case 10 through the third fixing plate 13. The active cell 35 is fixed on the sliding member 33. The stator 34 is fixed on the second fixing plate 12. The second fixing plate 12 is fixed on the third fixing plate 13, the fourth fixing plate 14, the fifth fixing plate 15 and the sixth fixing plate 16 with a presupposed distance defined between the stator 34 and active cell 35.

Figure 6:
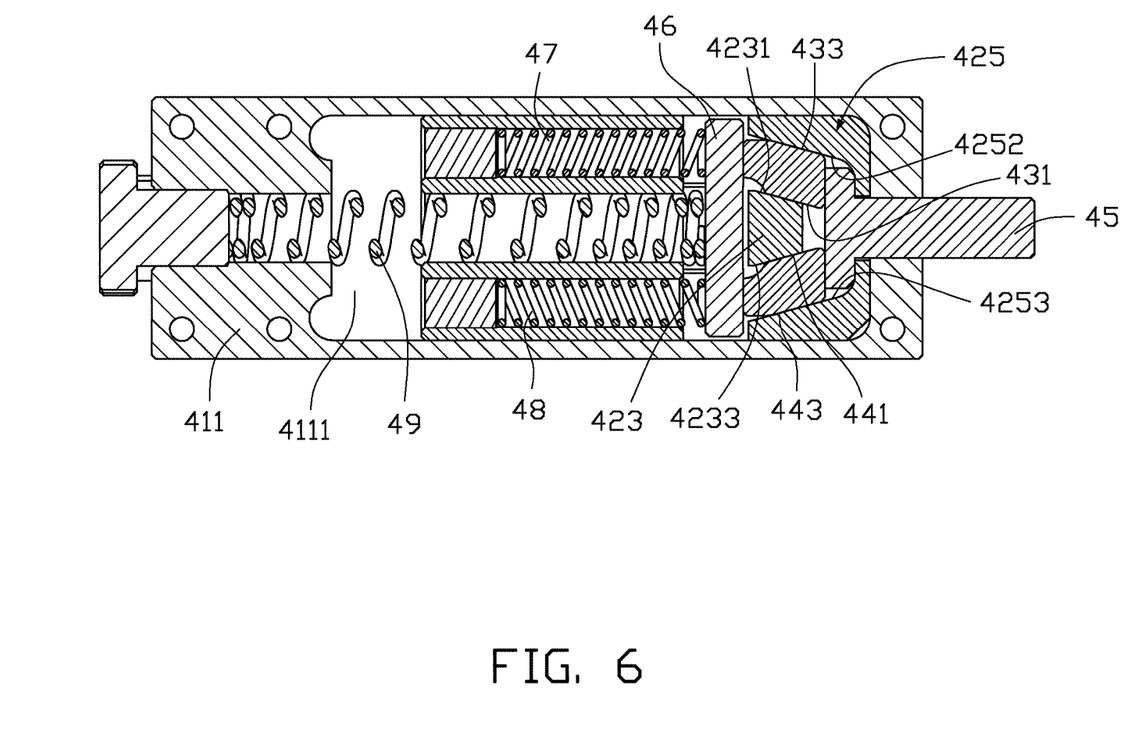
FIG. 6 is a cross-section view of the active member of FIG. 5 under an original state, taken along a line VI-VI thereof.

Referring to FIG. 6 and FIG. 7, the machining device 100 is in an original state. The extending part 335 of the sliding member 33 is clamped by the two first sliders 43 of the active member 402. When the machining device 100 works, referring to FIG. 8 and FIG. 9, the machining device 100 is in an operation state.

Figure 8:
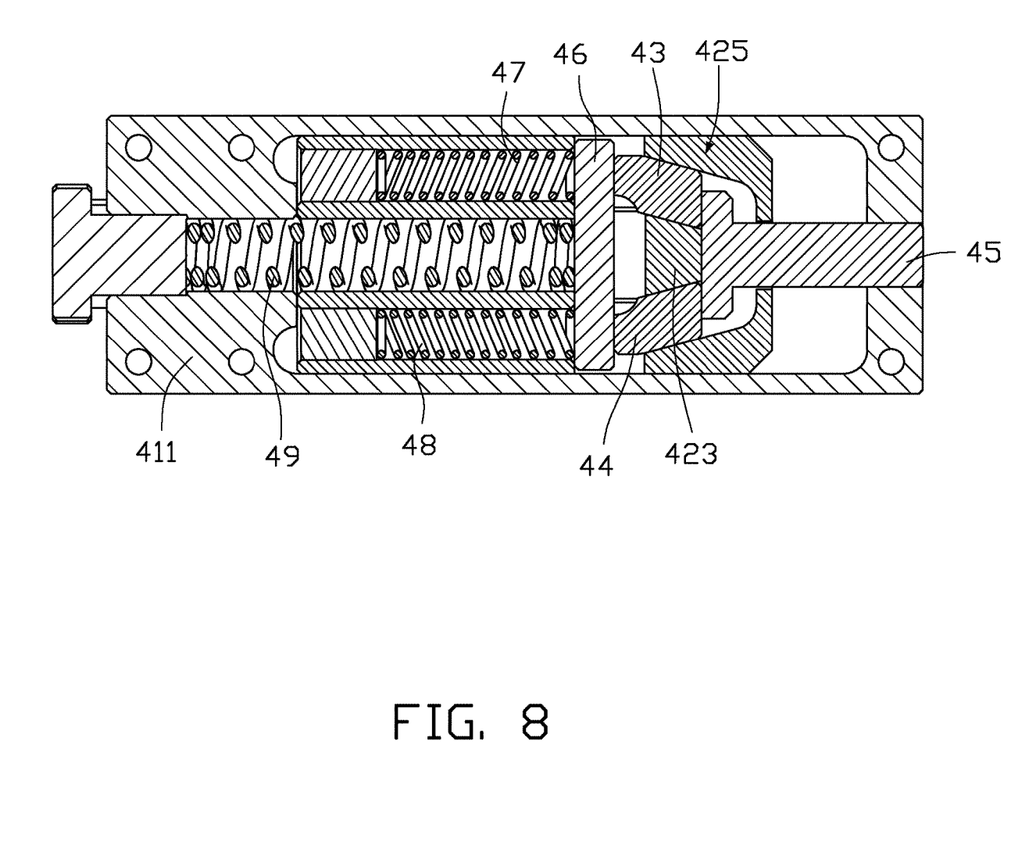
FIG. 8 is a cross-section view of the active member of FIG. 6 under an operation state.

When the machining device 100 works, the stator 34 is supplied with an electronic power. The pushing portion 45 is driven by the power member 401 to push the two first sliders 43. The two first sliders 43 are driven to slide along the two slant surfaces 4252, 4253 of the second bump 425 respectively and toward the second slider 46, thus driving the second slider 46 to move in the first groove 427 to compress the first elastic portions 47. At the same time, the resisting portion 42 is driven by the elastic forces of the first elastic portions 47 to slide in the cavity 4111 away from the pushing portion 45 and compress the second elastic portion 49. Thus, the two first sliders 43 slide away from each other to free the extending part 335 of the sliding member 33. Then, the above operation is made again and again until the pushing portion 45 resisting the first bump 423 and the end of the resisting portion 42 away from the pushing portion 45 resisting base 411, as shown in FIG. 8.

In the operation state, at the moment of the extending part 335 freed from the two first sliders 43, as shown in FIG. 9, the active cell 35 is driven by the stator 34 to move rapidly according to electromagnetic induction principle. Thus, the two draw slips 32 fixed on the sliding member 33 are driven by the active cell 35 to slide toward third fixing plate 13 rapidly on the corresponding sliding rails 31. At the same time, the machining mechanism 50 fixed on the sliding member 33 moves rapidly to make the work-piece be rapidly machined by the machined member.

After the work-piece machined, the stator 34 is stopped supplying electronic power and the power member 401 is stopped working. The second slider 46 is driven by the elastic forces of the first elastic portions 47 and the second elastic portion 49 to slide away from the fixing part 426. The two first sliders 43 are driven by the second slider 46 to move along the two slant surfaces 4252, 4253 of the second bump 425 and away from the second slider 46 to be close to each other, thereof clamping the extending part 335 of the sliding member 33 to make the sliding member 33 stopped moving toward the work-piece.

After the extending part 335 clamped, the extending part 335 of the sliding member 33 is relatively static and integrated to the two first sliders 43. Thus, the second slider 46 and the sliding member 33 are driven by the elastic forces of the first elastic portions 47 and the second elastic portion 49 to move toward the power member 401 until the end of the resisting portion 42 close to the pushing portion 45 resisting base 411, as shown in FIG. 6, thereof driving the machining mechanism 50 to move away from the work-piece.

In the exemplary embodiment of the present disclosure, after the work-piece machined, the extending part 335 is clamped by the two first sliders 43 via elastic forces of the first elastic portions 47 and the second elastic portion 49. And the sliding member 33 is stopped moving under frictional forces between the extending part 335 and the two first sliders 43. The velocity of stopping movement of the sliding member 33 is improved.

In addition, when the stator 34 is supplied with an electronic power, the active cell 35 is driven to move according to the electromagnetic induction principle and further drives the sliding member 33 to slide. Thus, the machining mechanism 50 makes a rapid rectilinear motion to machine the work-piece, thereof improving the machining efficiency.

In addition, the resisting portion 42 is positioned in the cavity 4111. After the extending part 335 clamped, the machining mechanism 50 is driven by the elastic force of the second elastic portion 49 to move away from the work-piece, thereof avoiding scuffing defects of the work-piece.

The embodiment shown and described above is only an example. Many details are often found in the art such as the other features of the street lamp. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:
1. A sliding mechanism, comprising:
a case;
a sliding assembly fixed in the case and comprising:
   a sliding member; and
   a driving member supplying power for the sliding member; and
a stopping assembly fixed in the case and comprising:
   a resisting portion comprising two slant surfaces;
   two first sliders positioned on the resisting portion;
   a pushing portion positioned on the resisting portion; and two first elastic portions resisting the first sliders and the resisting portion;

wherein the resisting portion, the two first sliders, the a pushing portion and the elastic portions are positioned in the case; the first sliders are configured for sliding on the resisting portion; and wherein, the first sliders, when driven by the pushing portion, move along the slant surfaces of the resisting portion and away from the resisting portion, thus compressing the first elastic portions; and the first sliders, when driven by the elastic forces of the first elastic portions, move along the slant surfaces and toward the sliding member, thus clamping the sliding member.

2. The sliding mechanism of claim 1, wherein the resisting portion further comprises a holding groove and a first bump received in the holding groove, the pushing portion is received in the holding groove and can slide in the holding groove.

3. The sliding mechanism of claim 2, wherein the first bump comprises two resisting surfaces, each first slider comprises a first surface and a second surface, the two first sliders are received in the holding groove, the first surfaces of the two first sliders are attached on the resisting surfaces of the first bump; and the second surfaces of the two first sliders are attached on the slant surfaces of the resisting portion.

4. The sliding mechanism of claim 3, wherein the stopping assembly further comprises a second slider, a first groove is defined on the resisting portion, the first groove is interconnected to the holding groove, the second slider is held in the first groove.

5. The sliding mechanism of claim 4, wherein the pushing portion is positioned close to the two first sliders, the second slider is connected to the two first elastic portions, when the second slider driven by the elastic forces of the first elastic portions to slide in the first groove, the two first sliders are driven by the second slider to move close to each other, thus clamping the sliding member.

6. The sliding mechanism of claim 3, wherein the stopping assembly further comprises a housing, the housing comprises a base and a lid fixed on the base, the base is fixed in the case, a cavity is defined on the base, the resisting portion is received in the cavity, when the pushing portion is driven toward the first bump, the resisting portion slides away from the pushing portion in the portion cavity.

7. The sliding mechanism of claim 6, wherein two sliding shots are defined on the lid, the top ends of the two first sliders protrude through the two sliding shots.

8. The sliding mechanism of claim 6, wherein the stopping assembly further comprises a second elastic portion, one end of the second elastic portion resists against the resisting portion and the other end of the second elastic portion resists against the base, when resisting portion slides away from the pushing portion, the second elastic portion is compressed.

9. The sliding mechanism of claim 4, wherein the resisting portion further comprises a supporting plate, a second bump and a fixing part; the first bump, the second bump and the fixing part are formed on the supporting plate.

10. The sliding mechanism of claim 9, wherein the second bump and the fixing part are located at edges of the supporting plate, the first bump is located between the second bump and the fixing part, the first bump is separated from the second bump and the fixing part.

11. The sliding mechanism of claim 10, wherein the first bump, the second bump and the fixing part extend away from a top surface of the supporting plate upwards and perpendicularly, top surfaces of the first bump, the second bump and the fixing part are coplanar.

12. The sliding mechanism of claim 10, wherein an opening is defined on the supporting plate, the opening penetrates a top and bottom surfaces of the supporting plate, and the opening is located between the fixing part and the first bump.

13. The sliding mechanism of claim 9, wherein the second bump comprises a bottom surface and the two slant surfaces, the two slant surfaces are slant to the bottom surface, the bottom surface faces the first bump, and a distance between the two slant surfaces increases gradually away from the bottom surface.

14. The sliding mechanism of claim 13, wherein the bottom surface, the slant surfaces and the supporting plate together define the holding groove, a second groove is defined on the bottom surface, the second groove is interconnected to the holding groove, and the pushing portion protrudes through the second groove.

15. The sliding mechanism of claim 2, wherein the sliding assembly further comprises four sliding rails and two draw slips, the sliding rails are fixed in the case, the draw slips are positioned on the sliding rails, and the sliding member is fixed on the draw slips.

16. The sliding mechanism of claim 15, wherein an extending part is formed on the sliding member, the two first sliders are located at two opposite sides of the extending part, and the extending part is clamped by the two first sliders under elastic forces of the first elastic portions.

17. The sliding mechanism of claim 15, wherein the driving member comprises a stator and an active cell, the active cell and stator are separated from each other with a presupposed distance therebetween.

18. A machining device, comprising:
a sliding mechanism comprising:
a case;
a sliding assembly fixed in the case and comprising:
a sliding member; and
a driving member supplying power for the sliding member; and
a stopping assembly fixed in the case and comprising:
a resisting portion comprising two slant surfaces;
two first sliders positioned on the resisting portion;
a pushing portion positioned on the resisting portion; and
two first elastic portions resisting the first sliders and the resisting portion; and
a machining mechanism fixed on an end of the sliding mechanism;
wherein the resisting portion, the two first sliders, the a pushing portion and the elastic portions are positioned in the case; the first sliders are configured for sliding on the resisting portion; and
wherein, the first sliders, when driven by the pushing portion, move along the slant surfaces of the resisting portion and away from the resisting portion, thus compressing the first elastic portions; and the first sliders, when driven by the elastic forces of the first elastic portions, move along the slant surfaces and toward the sliding member, thus clamping the sliding member.

19. The machining device of claim 18, wherein the machining mechanism comprises a an external member, a link member, a fixing member and a machined member fixed on the fixing member; the external member is fixed on the case, the link member is fixed on the sliding member, the link member protrudes out of the case through the external member, and the fixing member is fixed on the link member.

20. The machining device of claim 18, wherein a through hole is defined in the sliding member, a channel is defined in the link member, and the channel is interconnected to the through hole of the sliding member; a through hole is defined in the fixing member, and the through hole of the fixing member is interconnected to the channel of the link member.

* * * * *

UNITED STATES PATENT AND TRADEMARK OFFICE
CERTIFICATE OF CORRECTION

PATENT NO. : 10,033,247 B2
APPLICATION NO. : 14/920891
DATED : July 24, 2018
INVENTOR(S) : Ming-Lu Yang et al.

Page 1 of 1

It is certified that error appears in the above-identified patent and that said Letters Patent is hereby corrected as shown below:

On the Title Page

Please replace item (73) regarding "Assignees" with the following:
(73) Assignees: FU DING ELECTRONICAL TECHNOLOGY (JIASHAN)
CO., LTD., Jiashan (CN);
HON HAI PRECISION INDUSTRY CO., LTD., New Taipei (TW)

Signed and Sealed this
Fifth Day of November, 2019

Andrei Iancu
*Director of the United States Patent and Trademark Office*